(12) United States Patent
Fletcher (10) Patent No.: US 9,818,165 B2
(45) Date of Patent: Nov. 14, 2017

(54) BIRTH REGISTRATION

(71) Applicant: CONDUENT BUSINESS SERVICES, LLC, Dallas, TX (US)

(72) Inventor: Denise L. Fletcher, Simsbury, CT (US)

(73) Assignee: Conduent Business Services, LLC, Dallas, TX (US)

( * ) Notice: Subject to any disclaimer, the term of this patent is extended or adjusted under 35 U.S.C. 154(b) by 1260 days.

(21) Appl. No.: 13/856,722

(22) Filed: Apr. 4, 2013

(65) Prior Publication Data

US 2014/0304184 A1    Oct. 9, 2014

(51) Int. Cl.
G06Q 50/26    (2012.01)
G06Q 10/00    (2012.01)
G06Q 50/24    (2012.01)
G06Q 50/22    (2012.01)

(52) U.S. Cl.
CPC .......... *G06Q 50/265* (2013.01); *G06Q 10/00* (2013.01)

(58) Field of Classification Search
CPC combination set(s) only.
See application file for complete search history.

(56) References Cited

U.S. PATENT DOCUMENTS

| | | |
|---|---|---|
| 6,187,540 B1 | 2/2001 | Staub et al. |
| 7,170,391 B2 | 1/2007 | Lane et al. |
| 7,333,001 B2 | 2/2008 | Lane et al. |
| 7,894,519 B2 | 2/2011 | Winningstad et al. |
| 8,200,708 B2 | 6/2012 | Ghosh et al. |
| 8,224,753 B2 | 7/2012 | Atef et al. |
| 2001/0048756 A1 | 12/2001 | Staub et al. |
| 2004/0100363 A1* | 5/2004 | Lane .................... G06K 19/025 340/5.86 |
| 2006/0020459 A1 | 1/2006 | Carter et al. |
| 2008/0095409 A1 | 4/2008 | McQuaide |
| 2012/0203785 A1 | 8/2012 | Awada |
| 2012/0246121 A1 | 9/2012 | Osborne et al. |
| 2012/0315877 A1 | 12/2012 | Lewis |

(Continued)

OTHER PUBLICATIONS

Baby Day app for iPhone—copyright noted as 2010, by OptimizedApps.com.*

(Continued)

*Primary Examiner* — Mark A Fleischer
(74) *Attorney, Agent, or Firm* — Gibb & Riley, LLC (57) ABSTRACT

A system for registering a birth includes a processor and storage device. A location of a user is determined, using a first location detection method. The location of the user is verified, using a second location detection method. A security key is established with a registration authority according to the location. A birth registration report is generated in compliance with the birth registration requirements according to the location. The birth registration report comprises identification of the location, a picture of the newborn child, and a time stamp that identifies a time and date of the birth. The birth registration report is encrypted according to the security key, which prevents altering the birth registration report. The birth registration report is transmitted in encrypted format to a registrar of birth records for the location. The birth registration report is stored in encrypted format on a computerized device.

23 Claims, 4 Drawing Sheets

(56) References Cited

U.S. PATENT DOCUMENTS

2012/0317202 A1 12/2012 Lewis
2016/0078581 A1* 3/2016 Maher .................. G06Q 50/265
                                                         705/325

OTHER PUBLICATIONS

J.L.Akinode, "Improving National Security Using GPS Tracking System Technology", Mediterranean Journal of Social Sciences, vol. 2, (5) Oct. 2011. pp. 75-85.
Mybabyday, Baby Day App for IPhone, p. 1-2, Apr. 1, 2013.

* cited by examiner

BIRTH REGISTRATION

BACKGROUND

Systems and methods herein generally relate to registering a newborn child at birth and, more particularly, to devices that generate an encrypted birth registration report according to requirements of the location of the birth.

The World Health Organization, UNICEF, and the United Nations published a joint study in 2000 on the problem of birth registration. This study cited an estimated 50 million babies—more than two fifths of those born—are unregistered. The root causes of non-registration are often economic and political, or non-existent basic services in remote and underdeveloped areas.

The World Health Organization defines a live birth as a baby that breathes or shows any other sign of life after delivery, irrespective of the duration of pregnancy. The United Nations view is that all babies born alive should be registered and their existence recognized whatever their gestational age and regardless of whether they are still alive at the time of registration. Not all countries adopt this internationally recommended definition. In the Philippines, for example, a baby with a gestational life of less than seven months is not regarded as live-born if the child dies within 24 hours of delivery. In this case, the baby's birth and death go unrecorded. However, if a full-term baby is born dead, it is considered a fetal death and recorded as such; other countries have yet to apply definitions of live birth nationwide. Some states in Mexico, for example, follow the international recommendations, while others do not require the registration of the birth or death of children who die within 24 hours of delivery.

A child who is not registered at birth is in danger of being shut out of society—denied the right to an official identity, a recognized name, and a nationality. These children have no birth certificate, the 'membership card' for society that should open the door to the enjoyment of a whole range of other rights including education and health care, participation, and protection. It shows that a child has a place, and a stake, in all three and offers protection against discrimination and neglect, determines a child's treatment in the justice system, and lasts a lifetime—guaranteeing an individual's right to take their place in the social and political life of their country.

When more families stayed in one place for generations, birth registration may have seemed less important. Every individual was well known to the surrounding community. However, with accelerating globalization and the growing movements of people both across and within national borders, having a recognized legal identity has become crucial. Denial of this basic right means denying not only the right to an identity, enshrined in Article 7 of the Convention on the Rights of the Child (CRC), but many other rights to which every citizen is entitled.

SUMMARY

Systems and methods herein disclose a birth registration application that may be installed on a smart device, such as a smart-phone, having location detection function. Using such an application allows the birthing attendant and/or birth parents to generate a permanent birth registration report.

According to a method herein, a location of a user is determined, based on a first location detection method, using a computerized device. The location of the user is verified, based on a second location detection method, using the computerized device. A security key is established with a registration authority according to the location, using the computerized device. A picture of a newborn child at birth is obtained, using the computerized device. Instruction on birth registration requirements according to the location are provided, using the computerized device. A birth registration report is generated in compliance with the birth registration requirements according to the location, using the computerized device. The birth registration report comprises identification of the location, the picture of the newborn child, and a time stamp that identifies a time and date of the birth. The birth registration report is encrypted according to the security key, using the computerized device. The security key prevents altering the birth registration report. The birth registration report is transmitted in encrypted format to a registrar of birth records for the location, using the computerized device. The birth registration report is stored in encrypted format on the computerized device.

According to a method for registering a birth using a handheld device, a location is determined, using a first location detection method of the handheld device. The location is verified, using a second location detection method of the handheld device. A picture of a newborn child at birth is obtained, using a camera function of the handheld device. A birth registration report is generated in compliance with birth registration requirements according to the location, using the handheld device. The birth registration report comprises identification of the location, the picture of the newborn child, and a time stamp that identifies a time and date of the birth. The birth registration report is encrypted, using the handheld device. The birth registration report is transmitted in encrypted format to a registrar of birth records for the location, using the handheld device.

According to a handheld device for registering a birth, a camera is operatively connected to the handheld device. The camera takes a picture of a newborn child at birth. A communication device is operatively connected to the handheld device. A processor is operatively connected to the camera and the communication device. The processor establishes a location of a user of the handheld device using a first method. The processor verifies the location of the user of the handheld device using a second method. The processor provides instruction to the user on birth registration requirements according to the location. The processor establishes a security key with a registration authority according to the location. The processor generates a registration report in compliance with the birth registration requirements according to the location. The registration report comprises the location, the picture of the newborn child, and a time stamp that identifies a time and date of the birth. The processor encrypts the birth registration report according to the security key. The security key prevents altering the birth registration report. The processor transmits the birth registration report in encrypted format to the registration authority, using the communication device. The processor stores the birth registration report in encrypted format on the handheld device.

According to a computer program product for enabling a smart-phone for registering a birth, the computer program product comprises a tangible computer readable storage medium having program code embodied therewith. The program code is readable and executable by a computer to provide an application to the smart-phone to enable the smart-phone to perform a method. According to the method, a location of the smart-phone is determined, based on a first location detection method. The location of the smart-phone is verified, based on a second location detection method.

Instruction on birth registration requirements according to the location is provided. A security key is established with a registration authority according to the location. A picture of a newborn child at birth is obtained, using a camera application of the smart-phone. A birth registration report is generated in compliance with registration requirements according to the location. The birth registration report comprises the location, the picture of the newborn child, and a time stamp that identifies a time and date of the birth. The birth registration report is encrypted according to the security key. The security key prevents altering the birth registration report. The birth registration report is transmitted in encrypted format to the registration authority. The birth registration report is stored in encrypted format on the smart-phone.

These and other features are described in, or are apparent from, the following detailed description.

BRIEF DESCRIPTION OF THE DRAWINGS

Various examples of the systems and methods are described in detail below, with reference to the attached drawing figures, which are not necessarily drawn to scale and in which.

DETAILED DESCRIPTION

The disclosure will now be described by reference to a smart-phone apparatus that includes a location determination system and a communication device to send an encrypted birth registration report to a recipient. While the disclosure will be described hereinafter in connection with specific devices and methods thereof, it will be understood that limiting the disclosure to such specific devices and methods is not intended. On the contrary, it is intended to cover all alternatives, modifications, and equivalents as may be included within the spirit and scope of the disclosure as defined by the appended claims.

For a general understanding of the features of the disclosure, reference is made to the drawings. In the drawings, like reference numerals have been used throughout to identify identical elements.

A country's political constitution or founding charter generally determines who is a national of that country, who is an alien, and how nationality can be acquired or lost. Some Governments follow the principle of jus soli, whereby those born within the country's territory are nationals, even if one or both parents came originally from another country. In such a case, birth registration gives the child automatic right to citizenship of the country in which he or she was born.

Disclosed herein is a birth registration application for a smart device, such as a smart-phone, which would allow a child to be registered upon birth where a smart-phone is available. GPS location can be used to verify the geographic location of birth in those countries that follow "jus soli" and, upon delivery, a smart device application can assist the birthing attendants/parents with the process of registering the child in that country. A camera device on the smart-phone can be used to take a picture of the newborn child (e.g. foot that is used in most countries to register a newborn birth). A microphone device on the smart-phone can be used to record baby sounds of the newborn child, or other audio notes from a birthing attendant or parent. In addition, guidance to the parents on why they must register their newborn child can be provided in this application to help reinforce why it is important.

By enabling birth registration capability in a smart device, the physical barriers to registration can be removed. Such capability should capture a greater number of unregistered births. According to devices and methods herein, this solution would reach remote areas of the global population where childbirth education may not be available. Details of data required for registration can be associated with the location obtained by the GPS in order to determine required country-to-country information.

While the information shown in a birth record and on a birth certificate may vary from country to country, the names of the child, the parents, the attending physician, midwife, birth attendant, or other witnesses are generally included, together with the date and place of birth, and the name and signature of the registrar. Other information may include the age of the mother and the child's height, weight and gestational age. Ensuring the rights to a name and nationality and to know one's parents implies that registration should, as a minimum, include the child's name, gender, date, and place of birth, and the name, address, and nationality of both parents. Some countries, such as Qatar, require additional information on the certificate, such as immunization status, and issue an immunization card along with the birth registration certificate. In the United States, for example, birth registration may also include application for a Social Security number. While a person's name may be their most distinctive indication of individuality—a right recognized in the CRC—additional data, such as family ties and nationality, promote the child's right to legal protection by parents and by the state.

The birth registration app according to devices and methods herein allows the birthing attendant and/or birth parents to:

1. Record, using GPS, the place and time of delivery.
2. Using the smart device camera, obtain a visual image of the newborn child as supporting documentation.
3. Using the smart device microphone, record the cry/voice print of the newborn child.
4. Register the birth of the newborn child in compliance with the birth country's requirement (including time limits).
5. Coach parents and birthing attendants on the reasons it is important to register a newborn's birth.
6. Sign the registration using a public government key to prevent subsequent alteration of the registration.

Figure 1:
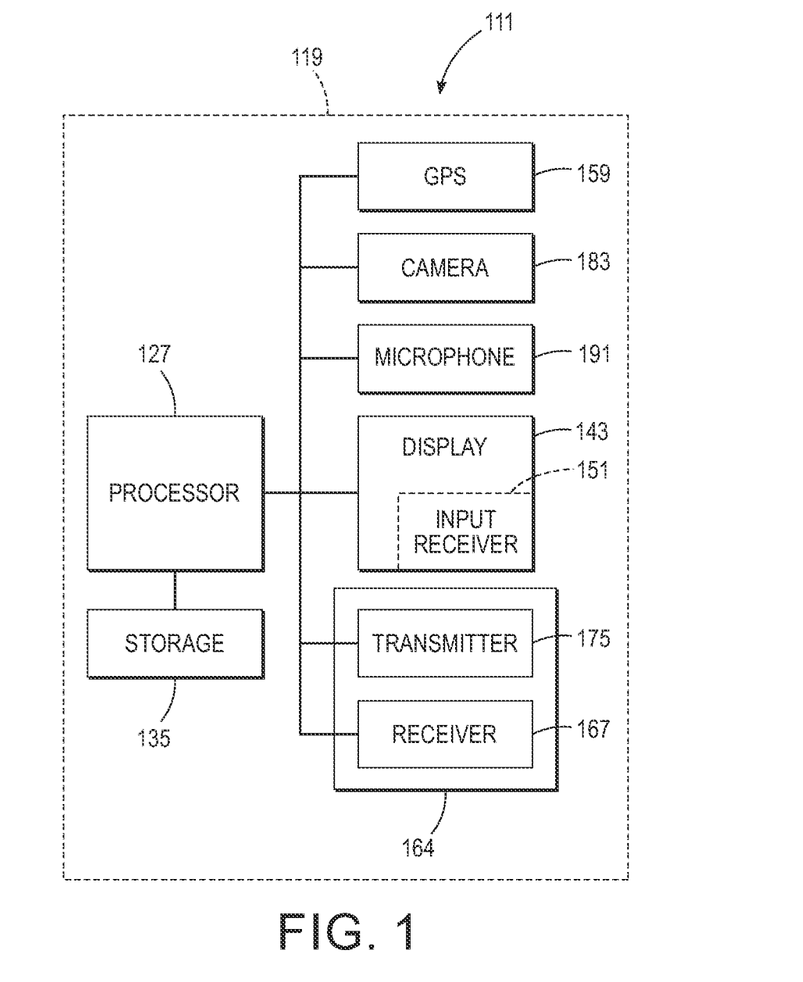
FIG. 1 is a block diagram of a system according to systems and methods herein.

Referring to FIG. 1, a block diagram of a system for registering a birth, indicated generally as 111, is shown. The system 111 is enclosed in a housing 119. The housing 119 contains a processor 127 operatively connected to a storage device 135. The storage device 135 has program code embodied therewith, which program code is readable and executable by the processor 127, as described in further detail below.

It should be understood that the processor 127 as used herein comprises a computerized device adapted to perform (i.e., programmed to perform, configured to perform, etc.) the below described system operations. According to systems and methods herein, the processor 127 comprises a programmable, self-contained, dedicated mini-computer having a central processor unit (CPU). Computerized devices that include chip-based central processing units (CPU's) are well-known and readily available devices produced by manufacturers such as Dell Computers, Round Rock Tex., USA, and Apple Computer Co., Cupertino Calif., USA. The details of such computerized devices are not discussed herein for purposes of brevity and reader focus.

Figure 2:
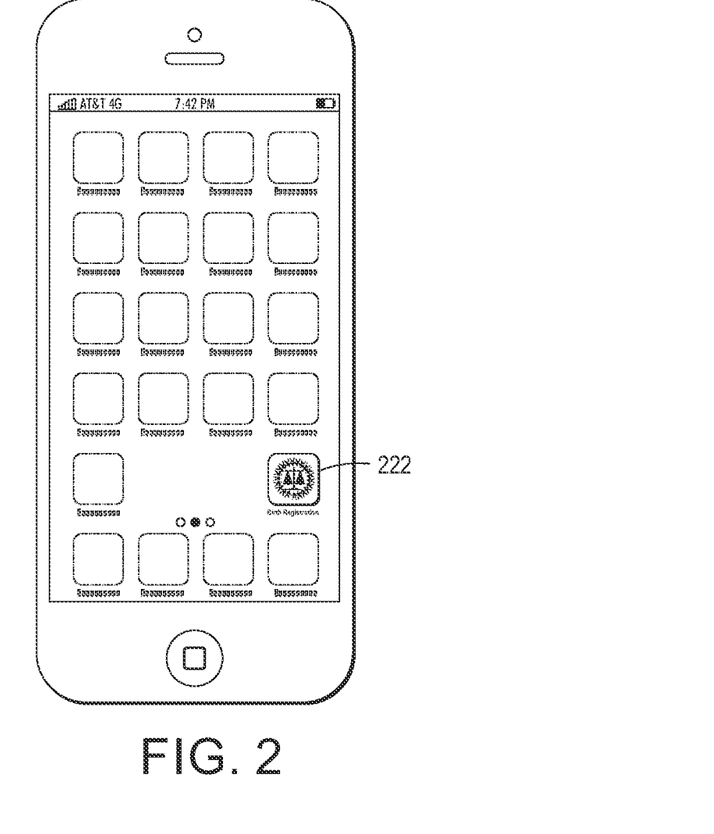
FIG. 2 is an illustration of a handheld device according to systems and methods herein.

The system 111 includes a display device 143 that can provide a user interface (UI) and can function as the main control interface for the system 111. The display device 143 may be a graphic user interface comprising a touch screen enabled screen, such as shown in FIG. 2, which will be the main go-to point for user interaction with the system 111. The display device 143 should be appropriately sized for a smart-phone or tablet device.

The display device 143 may include an input receiver 151 operatively connected to the processor 127. The input receiver 151 receives selection of a selected application to be performed by the processor 127. For example, referring to FIG. 2, a user may enter a Birth Registration App by selecting an appropriate icon, such as 222.

According to devices and methods herein, the system 111 may comprise a smart-phone or computer tablet. Smart-phone and tablet devices commonly include input/output devices, power supplies, processors, electronic storage memories, wiring, etc., the details of which are omitted herefrom to allow the reader to focus on the salient aspects of the systems and methods described herein.

As shown in FIG. 1, the system 111 includes a global positioning system (GPS) 159. The GPS 159 is operatively connected to the processor 127. The system 111 further includes a communications device 164 having a receiver 167 and a transmitter 175. The receiver 167 is operatively connected to the processor 127. The receiver 167 receives electromagnetic signals into the system, as described in further detail below. The transmitter 175 is operatively connected to the processor 127. The transmitter 175 transmits electromagnetic signals to a recipient, as described in further detail below. The communications device 164 may be capable of a variety of communication techniques, such as, but not limited to, telephone, e-mail, text using Short Message Service (SMS), and the like. As is known in the art, SMS is a text messaging service component of phone, web, or mobile communication systems, using standardized communications protocols that allow the exchange of short text messages between fixed line or mobile phone devices.

A camera 183 or other image acquisition device operatively connected to the processor 127 may also be included in the system 111. Additionally, the system 111 may include a microphone 191, to capture sounds or record audio notes. The microphone 191 is operatively connected to the processor 127.

The following is a non-limiting example of functions a user may be able to perform from the system 111. To begin, when a baby is born, the user may click on the Birth Registration icon 222. The program code when executed by the processor 127 causes the location of the device to be determined using two location detection methods. One method may be based on the GPS 159. Another method may be based on electromagnetic signals received by the receiver 167, such as, but not limited to, multilateration of radio signals between several radio towers of the network and the cellular phone signals, signal strength to nearby antenna masts, and/or via Wi-Fi connection. According to devices and methods herein, the processor 127 establishes the location of the device using one location detection method and the processor 127, independently, verifies the location using another location detection method.

In use, once the location of the device has been determined, the user may download birth registration requirements according to the location. Based on the downloaded birth registration requirements, the processor 127 may provide instruction to the user on how to prepare a birth registration report. While birth registration requirements vary from location to location, according to devices and methods herein, the birth registration report may comprise identification of the location and a time stamp that identifies a time and date of the birth of a newborn child. The user may obtain a picture of the newborn child using the camera 183 and include the picture with the birth registration report as supporting documentation. Additionally, the user may record baby sounds of the newborn child or comments from a birth attendant or parent using the microphone 191. The recorded sounds may be include with the birth registration report or simply stored in the storage device 135.

The user may also establish a security key with a registration authority according to the location. The security key may be part of a simple public-key infrastructure (SPKI) that enables the user to communicate securely on an insecure public network, and reliably verify the identity of the user via a digital signature. The security key is used by the processor 127 to encrypt the birth registration report and prevent it from being altered. The user can 'sign' the birth registration report using a virtual electronic signature, which birth registration report can then be transmitted in encrypted format, using the transmitter 175, to an appropriate recipient, such as a registrar of birth records for the location. Based on the type of security key used, an acknowledgment or other indication of receipt of the birth registration report may be received by the receiver 167. The birth registration report can also be stored in encrypted format on the storage device 135.

Additionally, the user may select to notify family or friends of the birth. Another feature enabled by selecting the Birth Registration icon 222 may be to send a message automatically to a predefined list of recipients in order to announce the birth. The message may include information similar to the information included in the birth registration report, such as time, date, and place of birth, as well as size, weight, and name of the child. A picture may also be included. The message may be sent using a text (SMS) or email feature of the smart-phone or tablet device.

Another feature of the devices and methods herein includes a storage function, such that when a birth registration report is created by the system 111 described herein, a virtual medical record is created for the child. The virtual medical record may be stored in encrypted format in a virtualized pool of storage, sometimes referred to as 'cloud storage'. According to devices and methods herein, the virtual medical record may include a chronological medical history of the child, such as a record of immunizations, procedures, prescriptions, and the like. The virtual medical record may include, in addition to various demographic information, procedural or visit codes and diagnostic codes. Other non-limiting information that can be included in a virtual medical record may include test information, such as lab tests, biopsies, surgical specimen exam, imaging tests and other tests with dates and diagnoses. The virtual medical record may be a permanent, legal document of the medical history of the identified person.

Figure 3:
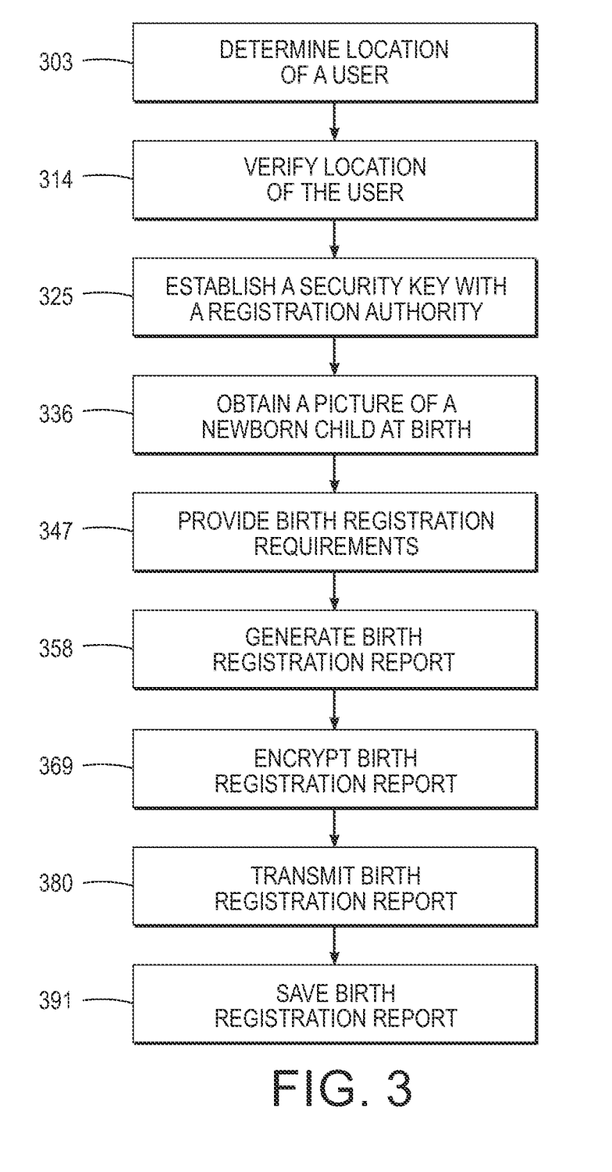
FIG. 3 is a flow diagram illustrating methods herein.

FIG. 3 is a flow diagram illustrating the processing flow of an exemplary method according to systems and methods herein. At 303, a location of a user is determined, based on a first location detection method, using a computerized device. At 314, the location of the user is verified, based on a second location detection method, using the computerized device. A security key is established with a registration authority according to the location, at 325. At 336, a picture of a newborn child at birth is obtained. Instruction on birth registration requirements according to the location are provided, at 347. A birth registration report is generated in compliance with the birth registration requirements according to the location, at 358. The birth registration report comprises identification of the location, the picture of the newborn child, and a time stamp that identifies a time and date of the birth. At 369, the birth registration report is encrypted according to the security key. The security key prevents altering the birth registration report. At 380, the birth registration report is transmitted in encrypted format to a registrar of birth records for the location. At 391, the birth registration report is stored in encrypted format on the computerized device.

Figure 4:
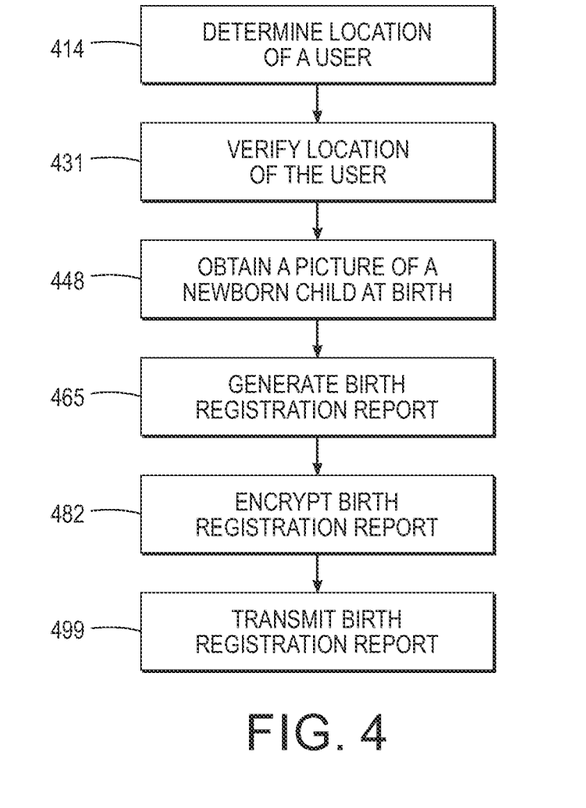
FIG. 4 is a flow diagram illustrating methods herein.

FIG. 4 is a flow diagram illustrating the processing flow of another exemplary method according to systems and methods herein. At 414, a location is determined, using a first location detection method. At 431, the location is verified, using a second location detection method. A picture of a newborn child at birth is obtained, using a camera at 448. A birth registration report is generated in compliance with birth registration requirements according to the location, at 465. The birth registration report comprises identification of the location, the picture of the newborn child, and a time stamp that identifies a time and date of the birth. The birth registration report is encrypted, at 482. At 499, the birth registration report is transmitted in encrypted format to a registrar of birth records for the location.

Aspects of the present disclosure are described herein with reference to flowchart illustrations and/or block diagrams of methods, apparatus (systems) and computer program products according to various systems and methods. It will be understood that each block of the flowchart illustrations and/or two-dimensional block diagrams, and combinations of blocks in the flowchart illustrations and/or block diagrams, can be implemented by computer program instructions. The computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

According to a further system and method herein, an article of manufacture is provided that includes a tangible computer readable medium having computer readable instructions embodied therein for performing the steps of the computer implemented methods, including, but not limited to, the method illustrated in FIGS. 3 and 4. Any combination of one or more computer readable non-transitory medium(s) may be utilized. The computer readable medium may be a computer readable signal medium or a computer readable storage medium. The non-transitory computer storage medium stores instructions, and a processor executes the instructions to perform the methods described herein. A computer readable storage medium may be, for example, but not limited to, an electronic, magnetic, optical, electromagnetic, infrared, or semiconductor system, apparatus, or device, or any suitable combination of the foregoing. Any of these devices may have computer readable instructions for carrying out the steps of the methods described above with reference to FIGS. 3 and 4.

The computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Furthermore, the computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

In case of implementing the systems and methods herein by software and/or firmware, a program constituting the software may be installed into a computer with dedicated hardware, from a storage medium or a network, and the computer is capable of performing various functions if with various programs installed therein.

The terminology used herein is for the purpose of describing particular devices and methods only and is not intended to be limiting of this disclosure. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In addition, terms such as "right", "left", "vertical", "horizontal", "top", "bottom", "upper", "lower", "under", "below", "underlying", "over", "overlying", "parallel", "perpendicular", etc., used herein, are understood to be relative locations as they are oriented and illustrated in the drawings (unless otherwise indicated). Terms such as "touching", "on", "in direct contact", "abutting", "directly adjacent to", etc., mean that at least one element physically contacts another element (without other elements separating the described elements). Further, the terms 'automated' or 'automatically' mean that once a process is started (by a machine or a user), one or more machines perform the process without further input from any user.

The corresponding structures, materials, acts, and equivalents of all means or step plus function elements in the claims below are intended to include any structure, material, or act for performing the function in combination with other claimed elements as specifically claimed. The descriptions of the various devices and methods of the present disclosure have been presented for purposes of illustration, but are not intended to be exhaustive or limited to the devices and methods disclosed. Many modifications and variations will be apparent to those of ordinary skill in the art without departing from the scope and spirit of the described devices and methods. The terminology used herein was chosen to best explain the principles of the devices and methods, the practical application or technical improvement over technologies found in the marketplace, or to enable others of ordinary skill in the art to understand the devices and methods disclosed herein.

It will be appreciated that the above-disclosed and other features and functions, or alternatives thereof, may be desirably combined into many other different systems or applications. Those skilled in the art may subsequently make various presently unforeseen or unanticipated alternatives, modifications, variations, or improvements therein, which are also intended to be encompassed by the following claims. Unless specifically defined in a specific claim itself, steps or components of the systems and methods herein should not be implied or imported from any above example as limitations to any particular order, number, position, size, shape, angle, color, temperature, or material.

What is claimed is:

1. A method, comprising:
   determining a location of a user, based on a first location detection method, by a computerized device;
   verifying said location of said user, based on a second location detection method, by said computerized device, said second location detection method being different from said first location detection method;
   establishing a security key with a birth registration authority according to said location, by said computerized device;
   obtaining a picture of a newborn child at birth, by said computerized device;
   determining birth registration requirements and data required for birth registration according to said location, by said computerized device;
   providing instruction to said user concerning said birth registration requirements according to said location, by said computerized device;
   generating a birth registration report in compliance with said birth registration requirements according to said location, by said computerized device, said birth registration report comprising:
   identification of said location,
   said picture of said newborn child, and
   a time stamp that identifies a time and date of said birth,
   encrypting said birth registration report according to said security key, by said computerized device, said security key preventing altering said birth registration report;
   transmitting said birth registration report in encrypted format to a registrar of birth records for said location, by said computerized device; and
   storing said birth registration report in encrypted format on said computerized device.

2. The method according to claim 1, said computerized device comprising one of a smart-phone and a tablet.

3. The method according to claim 1, one of said first location detection method and said second location detection method comprising using a global positioning system (GPS) to determine said location.

4. The method according to claim 1, said encrypting said birth registration report according to said security key further comprising signing said birth registration report with a virtual signature.

5. The method according to claim 1, further comprising receiving an indication of receipt of said birth registration report from said registrar of birth records for said location, using said computerized device.

6. The method according to claim 1, further comprising establishing a virtual medical record for said newborn child, using said computerized device.

7. A method for registering a birth using a handheld device, comprising:
   determining a location, by a first location detection method executing in said handheld device;
   verifying said location, by a second location detection method executing in said handheld device, said second location detection method being different from said first location detection method;
   obtaining a picture of a newborn child at birth, by a camera function of said handheld device;
   determining birth registration requirements and data required for birth registration according to said location, by a said handheld device;
   generating a birth registration report in compliance with said birth registration requirements according to said location, by said handheld device, said birth registration report comprising:
   identification of said location,
   said picture of said newborn child, and
   a time stamp that identifies a time and date of said birth,
   encrypting said birth registration report, by said handheld device; and
   transmitting said birth registration report in encrypted format to a registrar of birth records for said location, by said handheld device.

8. The method according to claim 7, said handheld device comprising one of a smart-phone and a tablet.

9. The method according to claim 7, one of said first location detection method and said second location detection method comprising using a global positioning system (GPS) to determine said location.

10. The method according to claim 7, said encrypting said birth registration report further comprising signing said birth registration report with a virtual signature.

11. The method according to claim 7, further comprising receiving an indication of receipt of said birth registration report from said registrar of birth records for said location, using said handheld device.

12. The method according to claim 7, further comprising establishing a virtual medical record for said newborn child, using said handheld device.

13. A handheld device for registering a birth, comprising:
   a camera operatively connected to said handheld device, said camera taking a picture of a newborn child at birth;
   a communication device operatively connected to said handheld device; and
   a processor operatively connected to said camera and said communication device,
   said processor establishing a location of a user of said handheld device using a first method;
   said processor verifying said location of said user of said handheld device using a second method, said second method being different from said first method;
   said processor determining birth registration requirements and data required for birth registration according to said location;
   said processor providing instruction to said user concerning said birth registration requirements according to said location;
   said processor establishing a security key with a birth registration authority according to said location;
   said processor generating a birth registration report in compliance with said birth registration requirements according to said location, said birth registration report comprising:
   said location,
   said picture of said newborn child, and
   a time stamp that identifies a time and date of said birth;

said processor encrypting said birth registration report according to said security key, said security key preventing altering said birth registration report;

said processor transmitting said birth registration report in encrypted format to said birth registration authority, using said communication device; and said processor storing said birth registration report in encrypted format on said handheld device.

14. The handheld device according to claim 13, said handheld device comprising one of a smart-phone and a tablet.

15. The handheld device according to claim 13, one of said first method and said second method comprising using a global positioning system (GPS) to determine said location.

16. The handheld device according to claim 13, said processor encrypting said birth registration report according to said security key further comprising signing said birth registration report with a virtual signature.

17. The handheld device according to claim 13, said communication device further receiving an indication of receipt of said birth registration report from said birth registration authority for said location.

18. The handheld device according to claim 13, said processor further establishing a virtual medical record for said newborn child.

19. A computer system for enabling a smart-phone for registering a birth, said computer system comprising:

a smart-phone, and a program product comprising a non-transitory, computer readable storage medium having program code embodied therewith, said program code being readable and executable by said smart-phone to provide an application to said smart-phone to enable said smart-phone to perform a method comprising:

determining a location of said smart-phone, based on a first location detection method;

verifying said location of said smart-phone, based on a second location detection method, said second location detection method being different from said first location detection method;

determining birth registration requirements and data required for birth registration according to said location;

providing instruction to a user of said smart-phone concerning said birth registration requirements according to said location;

establishing a security key with a birth registration authority according to said location;

obtaining a picture of a newborn child at birth, using a camera application of said smart-phone;

generating a birth registration report in compliance with registration requirements according to said location, said birth registration report comprising:

said location, said picture of said newborn child, and a time stamp that identifies a time and date of said birth, encrypting said birth registration report according to said security key, said security key preventing altering said birth registration report;

transmitting said birth registration report in encrypted format to said birth registration authority; and storing said birth registration report in encrypted format on said smart-phone.

20. The computer system according to claim 19, one of said first location detection method and said second location detection method comprising using a global positioning system (GPS) to determine said location.

21. The computer system according to claim 19, said encrypting said birth registration report according to said security key further comprising signing said birth registration report with a virtual signature.

22. The computer system according to claim 19, further comprising receiving an indication of receipt of said birth registration report from said birth registration authority for said location, using said smart-phone.

23. The computer system according to claim 19, further comprising establishing a virtual medical record for said newborn child, using said smart-phone.

* * * * *